United States Patent Office 3,719,666
Patented Mar. 6, 1973

3,719,666
IMINO SUBSTITUTED α,β-UNSATURATED
ALIPHATIC ESTERS
Richard J. Anderson, Clive A. Henrick, and John B. Siddall, Palo Alto, Calif., assignors to Zoecon Corporation, Palo Alto, Calif.
No Drawing. Filed Jan. 13, 1971, Ser. No. 106,273
Int. Cl. C07d 23/02
U.S. Cl. 260—239 E                    10 Claims

ABSTRACT OF THE DISCLOSURE

Novel imino aliphatic esters prepared by reaction of haloketone with alkali azide, reduction of ketone, and conversion of azido alcohol to the imino which are useful for the control of insects.

The present invention relates to novel aliphatic imino compounds of Formula I, the preparation thereof, intermediates therefor and the control of insects.

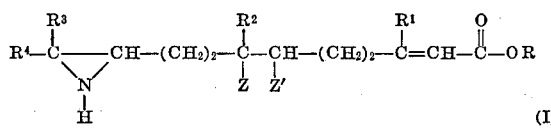

(I)

wherein each of R, $R^1$, $R^2$, $R^3$ and $R^4$ is lower alkyl and each of Z and Z' is hydrogen or, taken together, a carbon-carbon bond. The term "lower alkyl" refers to alkyl of one to six carbon atoms.

The compounds of Formula I are prepared according to the following outlined process:

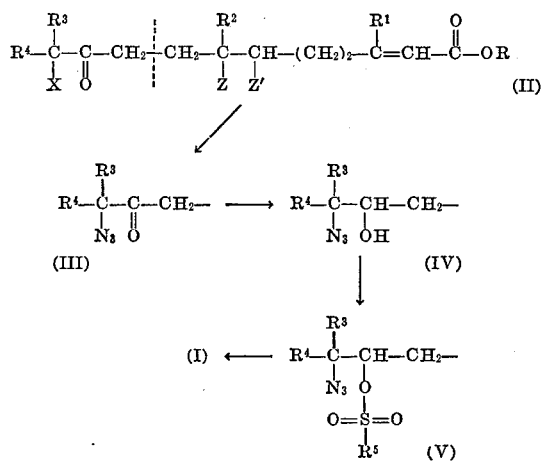

In the above formulas, each of R, $R^1$, $R^2$, $R^3$, $R^4$, Z and Z' is defined above, X is bromo or chloro, and partial formulas have been used for III, IV and V for the sake of brevity and clarity. $R^5$ is tolyl or methyl.

In the practice of the above process, a haloketone of Formula II is reacted with an alkali azide such as sodium azide in an organic solvent such as dimethylformamide, dimethylacetamide and the like at room temperature or above to afford the 11-azido compound III. The azidoketone III is then reduced using sodium borohydride or other reducing agent to yield the corresponding 10-hydroxy-11-azido of Formula IV. A compound of Formula IV is treated with tosyl or mesylchloride in triethylamine, pyridine or the like to form the sulfone V. A compound of Formula V is then reduced using a reducing agent formed or sodium borohydride and a transition metal such as a lower valence cobaltous halide. The reducing agent can be formed in the presence or absence of dipyridyl. The reduction and formation of the reducing agent can be carried out in an organic solvent such as ethanol, methanol, tetrapyrofuran, and other high boiling ethers.

The haloketones II can be prepared from the corresponding 11-halo-10-hydroxy compound (Canadian Patent No. 834,191) by oxidation using Jones reagent or chromium trioxide/pyridine or by the method of Loew et al., Proceeding of the National Academy of Sciences 67, No. 3, 1462 (1970).

The compounds of Formula I are useful for the control of insects. The compounds are applied using either liquid or solid carriers such as water, cottonseed oil, xylene, mineral oil, silicon, talc, natural and synthetic resins and the like. Generally, compositions for application will contain up to about 75% of the active compound and more usually less than 25%, sufficient composition should be applied to provide from about 0.1 to 25 micrograms of the active compound per insect. The compounds of Formula I can be formulated advantageously with other insect control compounds such as natural Cecropia juvenile hormone and analogs thereof for increased effectiveness. Typical insects controlled by the present invention are Diptera such as mosquitos and houseflies, Hemiptera such as Pyrrhocoridae and Miridae; Lepidoptera such as Pyralidae and Gelechidae, and Coleoptera such as Tenebrionidae, Chrysomelidae and Dermestidae. For example, *Pyrrhocoris apterus, Lygus hesperus, Galleria mellonella, Plodia interpuctella, Phthorimoea operculella, Tenebrio molitor, Triboleum confusum, Diabrotica duodecimpunctata, Dermestes maculatus, Aedes aegypti* and *Musca domestica*. Without any intention of being bound by theory, the compounds of Formula I are belivered to be effective by reason of hormonal action in that unlike conventional insecticides which are effective by reason of causing immediate death, the compounds of Formula I are effective by reason of physiological changes caused in the treated insect which result in eventual death of the insect and/or inability of the treated insect to reproduce by reason of sterility or abnormal development.

The following examples are provided to illustrate the invention. Temperature is given in degrees centigrade.

EXAMPLE 1

To 28 mg. of methyl 11-chloro-10-oxo-7-ethyl-3,11-dimethyltrideca-2,6-dienoate in 0.5 ml. of dimethylformamide is added 6.5 mg. of sodium azide and the temperature brought to 85°. After about 3.5 hours, the reaction is cooled to room temperature. The reaction is diluted with pentane and water, separated and the aqueous phase extracted with pentane/ether. The combined organic phases are washed with saturated sodium chloride solution, dried over magnesium sulfate and solvent evaporated to yield methyl 11-azido-10-oxo-7-ethyl - 3,11 - dimethyltrideca-2,6-dienoate.

To 26 mg. of the above prepared azido ketone in 0.5 ml. of anhydrous methanol is added about one mg. of sodium borohydride. After about one hour, water and ether is added and the layers separated. The aqueous layer is extracted with organic layer which is washed to neutrality using saturated sodium chloride. The organic phase is then dried over magnesium sulfate and solvent removed to yield methyl 11-azido-10-hydroxy-7-ethyl-3,11-dimethyltrideca-2,6-dienoate. Using siilca gel, the diastereomeric azide alcohols can be resolved, if desired.

A solution of 20 mg. of crude methyl 11-azido-10-hydroxy - 7-ethyl-3,11-dimethyltrideca-2,6-dienoate and 2.5 ml. of a 0.3 M triethylamine in pentane is cooled to −5°. Then 57 mg. of mesyl chloride is added. After 45 minutes, the reaction is poured onto ice and ether is added. The organic phase is washed with aqueous dilute HCl, saturated sodium bicarbonate, saturated sodium chloride and then dried over sodium sulfate and solvent removed to yield the corresponding 10-mesylate.

Anhydrous CoBr$_2$ (146 mg.) is dissolved in 10 ml. of absolute ethanol and then 312 mg. of dipyridyl is added followed by 76 mg. of sodium borohydride at 0° under argon.

To 35 mg. of the above prepared 10-mesylate in 0.8 ml. of ethanol at 0°, under argon, is added 0.20 ml. of the above prepared reducing solution and after several minutes an additional 0.5 ml. of the reducing solution is added. After 0.5 hour, the reaction is poured into water and ether added. The organic phase is washed with saturated sodium chloride solution, dried over magnesium sulfate and solvent removed to yield methyl 10,11-imino-7-ethyl-3,11-dimethyltrideca-2,6-dienoate which can be purified by chromatography.

EXAMPLE 2

The process of Example 1 is repeated using each of methyl 11 - chloro - 10-oxo-3,7,11-trimethyltrideca-2,6-dienoate and ethyl 11-chloro-10-oxo-3,7,11-trimethyldodec-2-enoate as the starting material to yield each of methyl 10,11-imino-3,7,11-trimethyltrideca-2,6-dienoate and ethyl 10,11-imino-3,7,11-trimethyldodec-2-enoate as the final products.

In the practice of the process of the present invention, there can be employed a mixture of isomers or a single isomer. With regard to isomerism at position C-2,3 there is preferably employed the trans isomer or a mixture of the cis/trans isomers. With regard to isomerism at position C-6,7, the isomerism is preferably trans. The isomers are separable by conventional analytical techniques such as fractional distillation and chromatography. For example, using the compound methyl 11-chloro-10-oxo-3,11-dimethyl-7-ethyltrideca-2 (trans), 6 (trans)-dienoate in the process of the present invention, there is obtained as the final product methyl 10,11 (cis, trans)-imino-3,11-dimethyl-7-ethyltrideca-2 (trans), 6 (trans)-dienoate.

What is claimed is:

1. A compound selected from those of the following formula:

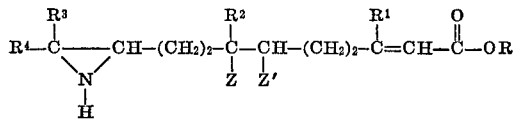

wherein each of R, $R^1$, $R^2$, $R^3$ and $R^4$ is lower alkyl and each of Z and Z′ is hydrogen or, taken together, a carbon-carbon bond.

2. A compound according to claim 1 wherein said lower alkyl is methyl or ethyl.

3. A compound according to claim 2 wherein the isomerism at position C-2,3 is trans.

4. A compound according to claim 3 wherein each of Z and Z′ is hydrogen.

5. A compound according to claim 3 wherein Z taken together with Z′ is a carbon-carbon bond and the isomerism at position C-6,7 is trans.

6. A compound according to claim 1 wherein each of $R^1$ and $R^3$ is methyl and each of R, $R^2$, $R^4$ is methyl or ethyl.

7. A compound according to claim 6 wherein each of Z and Z′ is hydrogen and the isomerism at position C-2,3 is trans.

8. A compound according to claim 6 wherein Z taken together with Z′ is a carbon-carbon bond and the isomerism at positions C-2,3 and C-6,7 is trans.

9. The compounds, ethyl 10,11 - imino-7-ethyl-3,11-dimethyltrideca-2 (trans), 6 (trans)-dienoate according to claim 1.

10. The compound, methyl 10,11-imino-3,11-dimethyl-7 - ethyltrideca-2(trans),6(trans)-dienoate, according to claim 1.

References Cited

Guthrie et al.: J. Chem. Soc. (London), 1963, pp. 5288–5294.

Smith: Open-Chain Nitrogen Compounds, vol. 2 (New York, 1966), pp. 254–255.

Wagner et al.: Synthetic Organic Chemistry (New York, 1953), pp. 149–152.

ALTON D. ROLLINS, Primary Examiner

U.S. Cl. X.R.

260—349, 408; 424—244